3,562,122
PREPARATION OF PLATINUM METAL
OXIDE REDUCTION CATALYST
James O. Thieme and Richard L. Every, Ponca City,
Okla., assignors to Continental Oil Company, Ponca
City, Okla., a corporation of Delaware
Filed Dec. 21, 1967, Ser. No. 692,343
Int. Cl. B01j *11/08;* B01k *1/00*
U.S. Cl. 204—61                                                                                          11 Claims

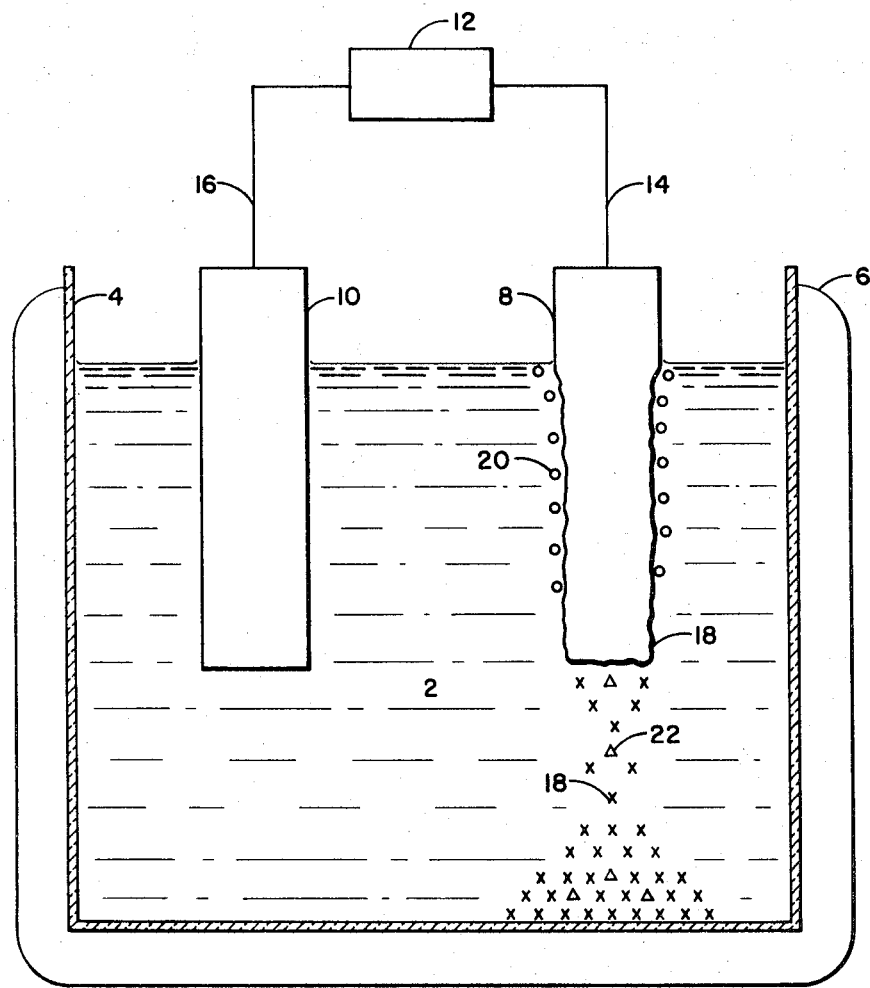

ABSTRACT OF THE DISCLOSURE

A method of preparing oxides of the platinum group of metals useful as reduction catalysts comprising passing an electric current through a molten solution of an oxygen-producing fused salt electrolyte using as the anode the metal of the desired oxide, to form on the anode a mixture of the metal and metal oxide which flakes off, is collected and separated from the fused salt electrolyte.

BACKGROUND OF THE INVENTION

(1) Field of the invention

This invention relates to a process for preparing platinum metal oxides. More specifically, this invention relates to a process of preparing catalyst materials composed of or containing platinum metal oxides.

(2) Description of the prior art

Platinum metal oxides are typified by platinum dioxide. Platinum dioxide is normally made by fusing chloroplatinic acid with sodium nitrate at an elevated temperature. The process involves relatively expensive chloroplatinic acid as a starting material, is time consuming, and demands close surveillance. Any unreacted chloroplatinic acid is difficult to recover.

U.S. Pat. No. 3,373,093, having the same assignee as the instant application, describes a method of preparing platinum-platinum dioxide reference electrodes useful in determining susceptibility of a metal to attack by a corrosive electrolytic solution. The reference electrode may be prepared by electrolysis of either a potassium chlorate or potassium nitrate fused salt using a platinum anode on which is formed an adherent layer of platinum dioxide. The instant inventors have found that this same reaction carried out further can produce a composition useful as a reduction catalyst.

BRIEF SUMMARY OF THE INVENTION

This invention involves a process for making platinum metal oxides, wherein an electric current of at least about 0.5 milliampere per square centimeter is passed through a molten solution of an oxygen-producing fused salt, such as an alkali metal nitrate or chlorate at a temperature of from about 350° C. to about 500° C. using as the anode in the electric circuit a platinum metal. The platinum metal is oxidized. As the oxide coating increases in thickness, it tends to flake off the anode along with a portion of the platinum metal itself. This mixture of platinum metal oxide and platinum metal is collected and separated from the electrolyte, as by dissolving the latter in hot water.

It is evident from the above description that it is an object of this invention to prepare a platinum metal oxide.

A further object is to prepare a platinum metal oxide directly from a platinum metal.

A still further object is to prepare a mixture of a platinum metal and a platinum metal oxide.

Another object is to prepare a reduction catalyst composition of a platinum metal and a platinum metal oxide with or without an inert support. Other objects, advantages, and features of this invention will become apparent from the following detailed description read in conjunction with the appended claims.

BRIEF DESCRIPTION OF THE DRAWING

The single figure is a schematic illustration of one form of the apparatus and materials which can be used to carry out the process of this invention.

DESCRIPTION OF THE PREFERRED EMBODIMENTS

The platinum group of metals are platinum, palladium, ruthenium, rhodium, osmium, and irridium. Of these, platinum and palladium, or oxides thereof, are the most widely used catalyst materials.

Platinum dioxide, $PtO_2$, known as Adams platinum oxide catalyst, is especially useful in the catalytic reduction of various organic compounds such as unsaturated hydrocarbons, aromatic hydrocarbons, ketones, higher alcohols, phenols, aromatic aldehyde, aromatic nitro compounds, and the like.

Referring to the figure, potassium nitrate 2 is placed in flask 4 which is surrounded by heating jacket 6. The temperature of potassium nitrate 2 is raised to from about 350° C. to about 500° C. Anode 8 of a platinum metal and cathode 10, which may be a platinum metal or any other suitable cathode material, are suspended in potassium nitrate 2 and connected to a source of electric current 12 by electrical leads 14 and 16. An electric current of about 0.5 ma./cm.$^2$ is applied. Initially, an adherent coating of platinum metal oxide 18 forms on anode 8 and oxygen 20 is evolved at this electrode. After about 1 to 4 hours, material which is a mixture of about 19 parts platinum metal oxide 18 and 1 part platinum metal 22 begins to flake off anode 8 and drop to the bottom of flask 4. The reaction is continued until either anode 8 is exhausted or oxygen evolution 20 ceases. The current is then turned off, the electrodes withdrawn, and the potassium nitrate 2 containing the mixture of platinum metal oxide 18 and platinum metal 22 allowed to cool. The solidified electrolyte of potassium nitrate 2 is dissolved as with hot water, and separated from the mixture of platinum metal oxide 18 and platinum metal 22, as by filtration.

Any oxygen-producing fused salt may be used, such as potassium nitrate, potassium chlorate, sodium nitrate, sodium chlorate and mixtures thereof.

The temperature required is that required to melt the fused salt. Generally, temperatures of from about 350° C. to 500° C. may be used.

The minimum electric current required is about 0.5 milliampere per square centimeter of anode area exposed to the fused salt. Currents lower than this will also yield the platinum metal oxide, but at a reduced rate so that the reaction requires an unreasonably long time for completion. The maximum electric current that may be used is about 150 ma./cm.$^2$. Currents higher than this will result in excess platinum metal being torn from the electrode and depositing along with the platinum metal oxide.

It is desired to maximize the conversion of platinum metal to the corresponding oxide.

During the reaction some oxygen evolves at the anode and escapes to the atmosphere. Thus it is desired to use a slight excess of the stoichiometric amount of fused salt necessary to convert the platinum metal to the oxide.

vessel pressured to 50 p.s.i. with hydrogen. The vessel was agitated by shaking. The reaction was allowed to continue until hydrogen pressure stopped dropping, indicating completion of the reaction. The reaction product was analyzed by gas liquid phase chromatography. The results of these tests are shown in the table.

TABLE

| Amount of catalyst, mg. | Length of reaction, min. | Hydrogen pressure at end of test, p.s.i. | GLPC analysis of reaction product |
|---|---|---|---|
| 100, commercial PtO₂ on 9 gram carbon. | 200 | 15 | Nitrobenzene, aniline and methanol. |
| 33, Example 1 | 60 | 5 | Aniline and methanol. |
| 38, Example 2 | 60 | 5 | Do. |
| 62.5, Example 3 | 59 | 5 | Do. |

The reaction product is obtained as a mixture of the platinum metal and platinum metal oxide particles which settles to the bottom of the reaction container. Using the minimum recommended electric current, the reaction mixture is composed of about 95% platinum metal oxide and 5% platinum metal. The amount of platinum metal in the mixture increases slightly with an increase in electric current. At the maximum recommended current the reaction product is composed of about 87.5% platinum metal oxide and 12.5% platinum metal. Following cooling, the reaction product is separated from the solidified fused salt by any convenient separation technique, such as by dissolving the fused salt in a suitable solvent, such as hot water. The reaction product is then separated from the solvent, as by filtration and dried. Usually, the reaction product is then ground to a uniformly sized powder with particles from 1 to 5 microns.

One of the principal uses of the reaction product is as a reduction catalyst. The catalyst mixture may be employed alone as a powder or combined with an inert support or carrier. Suitable carriers are solid dehydrated oxides of an element of groups III to VIII of the periodic system, such as chromium oxide, zirconium dioxide, iron oxide, silica, dehydrated silica gel, and alumina. Refractory silicates may also be used, such as fused beryllium silicate, fused aluminum silicate, and fused zirconium silicate. Other types of carrier include naturally occurring materials, such as tripoli, quartz, corundum, zircon, rutile, brookite, anatase, beryl, cristobalite, baddeleyite, thalenite, thorite, bromellite, chrysoebryl, tridymite, opal, and the like.

Example 1.—A platinum anode having a surface area of about 10 square centimeters and a platinum cathode were immersed in 100 cc. of fused potassium nitrate heated to 400° C. A total of 8 cm.² of the platinum anode was exposed to the potassium nitrate. An electric current of 6 ma./cm.² was applied to the system for 4 hours. A mixture of platinum dioxide and platinum metal flaked off the anode and fell to the bottom of the flask. The system was allowed to cool to room temperature. The solidified potassium nitrate was dissolved in water at room temperature. The mixture of 15 parts platinum dioxide and 1 part platinum was filtered off, dried, and ground to a fine powder of 1 to 5 microns.

Example 2.—The same process as above was repeated only using an electric current of 65 ma./cm.². The product recovered was composed of 10 parts platinum dioxide and 1 part platinum.

Example 3.—The same process as above was repeated using an electric current of 150 ma./cm.². The product recovered was composed of 7 parts platinum dioxide and 1 part platinum.

These three platinum dioxide platinum powders were compared against a commercial catalyst of platinum dioxide supported by granular carbon as reduction catalyst. 200 ml. solution of 4% (by weight) nitrobenzene in methanol was placed in a 500 ml. capacity pressurized metal container, a quantity of catalyst added, and the These results show that with the commercial platinum dioxide the reaction took longer and did not go to completion, i.e., the reaction product still contained some nitrobenzene reactant. With the three catalyst mixtures of this invention, the reaction went to completion in a relatively short time.

While the foregoing description has been concerned mainly with the preparation and use of platinum dioxide, it is to be understood that the same techniques may be used to prepare oxides of the other platinum metal oxides, especially palladium dioxide.

The invention having thus been described, what is claimed and desired to be secured by Letters Patent is:

1. A method of preparing a mixture of a platinum metal and a platinum metal oxide comprising passing an electric current of from 0.5 to 150 milliamperes per square centimeter through a molten solution of an oxygen-producing fused salt using a platinum metal anode, continuing the reaction for a length of time of from 1 hour to the time when the reaction ceases to form a mixture of particulate platinum metal oxide and platinum metal, which mixture flakes off said anode, and separating the mixture of platinum metal and platinum metal oxide from the fused salt.

2. The method of claim 1 wherein the reaction temperature is from 350° C. to 500° C.

3. The method of claim 1 wherein a stoichiometric excess of fused salt is used.

4. The method of claim 1 wherein the platinum metal is platinum.

5. The method of claim 1 wherein the oxygen producing fused salt is selected from the class consisting of potassium nitrate, potassium chlorate, sodium nitrate, sodium chlorate and mixtures thereof.

6. A method of preparing a platinum metal-platinum metal oxide reduction catalyst comprising passing an electric current of about 0.5 milliampere per square centimeter through a molten solution of an oxygen-producing fused salt using a platinum metal anode, continuing the reaction for a length of time of from 1 hour to the time when reaction ceases whereby a mixture of platinum metal and platinum metal oxide flakes off said anode and separating said mixture of platinum metal and platinum metal oxide reduction catalyst from the fused salt.

7. The method of claim 6 wherein the platinum metal is platinum.

8. The method of claim 6 wherein amount of fused salt used is in excess of the stoichiometric amount required to convert the platinum metal to a platinum metal oxide.

9. The method of claim 6 wherein the mixture of platinum metal and platinum metal oxide reduction catalyst is combined with an inert support.

10. The method of claim 6 wherein the reaction temperature is from 350° C. to 500° C.

11. The method of claim 6 wherein the oxygen producing fused salt is selected from the class consisting of potassium nitrate, potassium chlorate, sodium nitrate, sodium chlorate and mixtures thereof.

References Cited

UNITED STATES PATENTS

| | | | |
|---|---|---|---|
| 1,151,045 | 8/1915 | Richardson | 252—472X |
| 1,257,531 | 2/1918 | Richardson | 252—472X |
| 2,093,406 | 9/1937 | Atkinson | 204—64X |
| 2,813,068 | 11/1957 | Steinberg et al. | 204—64 |
| 2,079,840 | 5/1937 | Byrkit, Jr. | 252—460 |

OTHER REFERENCES

Poggendorf: Annalen, vol. 72, p. 481, Leipzig, 1847.

DANIEL E. WYMAN, Primary Examiner

C. F. DEES, Assistant Examiner

U.S. Cl. X.R.

204—64; 252—472